US006269275B1

(12) United States Patent
Slade (10) Patent No.: US 6,269,275 B1
(45) Date of Patent: *Jul. 31, 2001

(54) METHOD AND SYSTEM FOR CUSTOMIZING AND DISTRIBUTING PRESENTATIONS FOR USER SITES

(76) Inventor: Michael G. Slade, 579 Kansas St., San Francisco, CA (US) 94107

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/053,144

(22) Filed: Mar. 31, 1998

(51) Int. Cl.⁷ .................................................. G06F 17/00
(52) U.S. Cl. ........................... 700/90; 345/329; 345/333
(58) Field of Search .................................. 707/100, 103, 707/104; 700/17, 83, 90, 99; 345/329, 333, 335

(56) References Cited

U.S. PATENT DOCUMENTS

| | | | |
|---|---|---|---|
| 4,513,415 | 4/1985 | Martinez | 370/92 |
| 4,602,279 | 7/1986 | Freeman . | |
| 5,151,782 | 9/1992 | Ferraro | 358/86 |
| 5,382,970 | 1/1995 | Kiefl | 348/1 |
| 5,442,389 | 8/1995 | Blahut et al. | 348/7 |
| 5,446,891 | 8/1995 | Kaplan et al. | 395/600 |
| 5,455,903 | 10/1995 | Jolissaint et al. | 395/155 |
| 5,512,935 | 4/1996 | Majeti et al. | 348/9 |
| 5,526,035 | 6/1996 | Lappington et al. | 348/13 |
| 5,530,438 | 6/1996 | Bickham et al. . | |
| 5,534,913 | 7/1996 | Majeti et al. | 348/7 |
| 5,579,055 | 11/1996 | Hamilton et al. | 348/346 |
| 5,592,511 | 1/1997 | Schoen et al. | 375/220 |
| 5,600,643 | 2/1997 | Robrock | 370/399 |
| 5,636,346 | 6/1997 | Saxe . | |
| 5,642,483 | 6/1997 | Topper . | |
| 5,654,747 | 8/1997 | Ottesen et al. | 348/12 |
| 5,694,334 | 12/1997 | Donahue et al. . | |
| 5,708,780 | 1/1998 | Levergood et al. | 395/200.12 |
| 5,710,884 | 1/1998 | Dedrick | 395/200.7 |
| 5,710,887 | 1/1998 | Chelliah et al. | 395/226 |
| 5,890,152 | * 3/1999 | Rapaport et al. | 707/6 |
| 5,892,909 | * 4/1999 | Grasso et al. | 395/200.31 |
| 5,905,988 | * 5/1999 | Schwartz et al. | 707/104 |

* cited by examiner

Primary Examiner—Paul P. Gordon
(74) Attorney, Agent, or Firm—Bernard L. Kleinke; Foley and Lardner (57) ABSTRACT

A method and system for customizing and distributing for user sites is disclosed and includes gathering user profile information to create data objects based on individual user profile information. The data objects are accessible locally in a group of user computer sites. Presentation logic objects employing the data objects are created to facilitate the creation of individual customized presentations, at the user sites. The data objects are accessible locally at the user computer sites. Presentation media objects are broadcasted to the computer sites. Certain ones of the media components of the media objects are selected in response to the individual presentation logic objects and the individual data objects to create customized presentations for the users at their user sites.

24 Claims, 6 Drawing Sheets

METHOD AND SYSTEM FOR CUSTOMIZING AND DISTRIBUTING PRESENTATIONS FOR USER SITES

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

1. Technical Field

The present invention relates in general to a method and system for customizing and distributing presentations for user sites. It more particularly relates to such a method and apparatus which can be utilized for broadcasting or otherwise transmitting to a large number of remotely located user sites customized presentations including audio, video or textual elements.

2. Background Art

Customized presentations have been created and successfully communicated to a large number of recipients. In so doing, each one of the recipients can receive an individually customized message or presentation in a highly effective and efficient manner. For example, reference may be made to the following U.S. Pat. Nos. 4,671,772, 4,863,384, 5,099,422 and 5,550,735, which are incorporated herein by reference.

The foregoing patents are incorporated herein by reference, and disclose techniques for creating customizing or personalizing presentation media, such as video cassette tapes, computer memory devices or the like. According to the patented techniques, information is gathered concerning each one of the users to facilitate the customization. Such information could include the name, address, preferences, and many other attributes of each recipient. Thus, the customized presentation can include personalization by incorporating the name of the user in the presentation.

Once this information has been gathered, the presentation media is then compiled from a library of presentation components. In one form of the patented inventions, the customized presentation is stored on a video cassette tape, which can be mailed or otherwise delivered to the recipient who can then play back the tape to receive the customized information. For example, the user may have ordered financial planning information concerning his or her specific personal requirements. The video cassette tape could then be played back with the use of a video tape recorder, whereby the recipient is able to witness an audio and visual presentation, which may include images of textual material. The entire presentation can be selected from only those presentation components which correspond to the attributes or requirements of the recipient. The customization can also include personalization, such as by employing the name of the user in the presentation itself or showing graphics.

The patented techniques also contemplate the delivery of the customized presentations via cable television or computer networks, such as the Internet. In this manner, the customized presentations are compiled at a centralized location, and then are able to be delivered directly to remotely located user sites equipped with devices such as cable television receivers or personal computers. The manner of delivery is via broadcast transmission over a transmission network, such as a cable television network, the Internet or other computer networks, broadcast television, or a satellite system.

Figure 2:
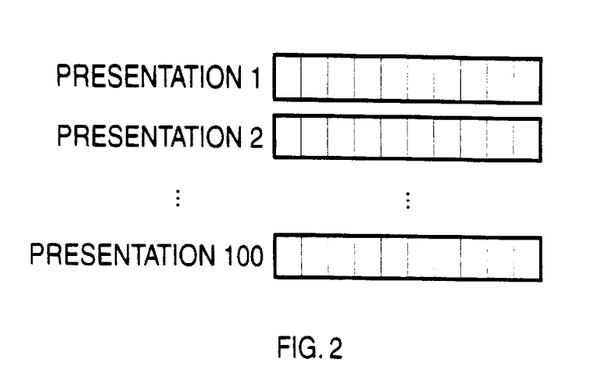
FIGS. 2, 3, 4, 5, 6 and 7 are diagrams useful in understanding the present invention.

However, while such techniques may be successfully employed for many applications, there can be significant and unwanted bandwidth problems where a large number of presentation components and user sites are involved. For example, as shown in FIG. 2, assume a producer desires to deliver 100 uniquely different customized individual presentations each being 10 minutes in length to 100 different remotely located user sites. In accordance with the patented methods of mass creation of unique presentations 1 through 100 indicated in FIG. 2, such presentations can be transmitted individually on demand.

Figure 3:
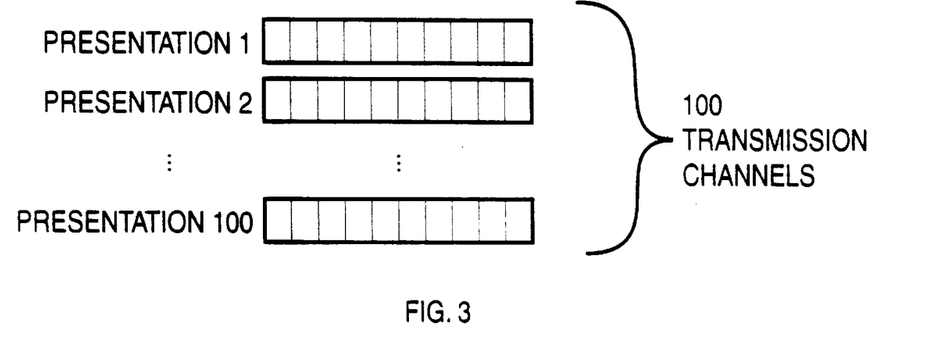

This method can be made to perform satisfactorily for some applications, but it presents challenges for distribution in terms of the bandwidth required to transmit the presentations. For example, as indicated in FIG. 3, if all viewers wish to see their unique presentations at the same time, there must be sufficient transmission channels for all 100 presentations at one time. Thus, there must be a minimum of 100 channels. This requires an unduly large bandwidth requirement for some applications, both in terms of transmission bandwidth and server requirements.

Figure 4:
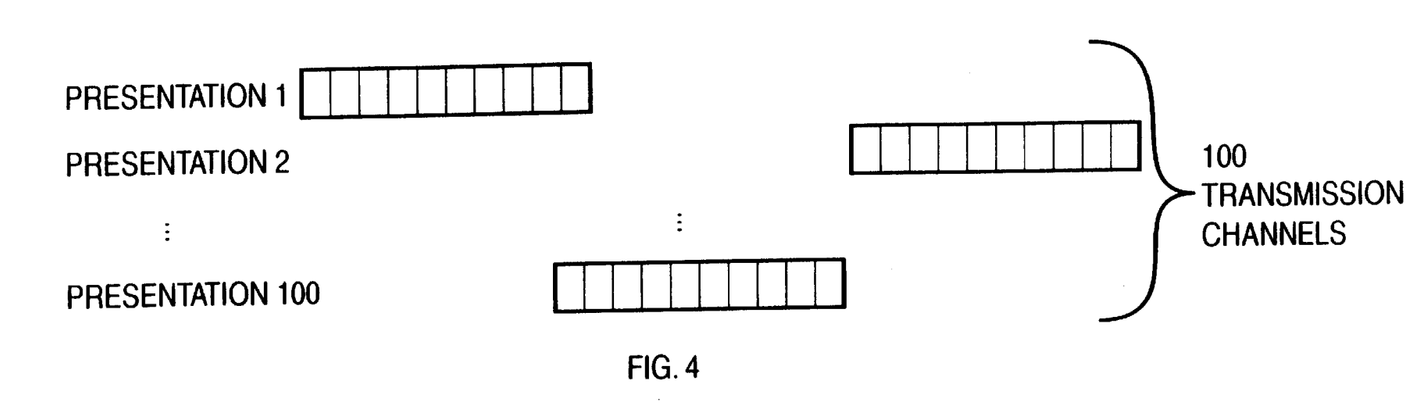

If viewers are free to view their own presentation at any time as shown in FIG. 4, there is still the requirement to support the worst case of at least 100 separate channels to permit 100 simultaneous transmissions of 100 different presentations to 100 different user sites (FIG. 3). If there are not a sufficient number of channels for this worse case situation, then all users may not receive their desired transmissions. In this regard, if there are a smaller number of channels as compared to the number of users, viewers making requests in excess of the network capacity will be informed that their request cannot be serviced until a later time, thereby receiving a "busy signal." In the situation where a relatively large number of presentations and user sites are involved, the exceeding of the network capacity may well be highly undesirable and unwanted for some applications.

Figure 5:
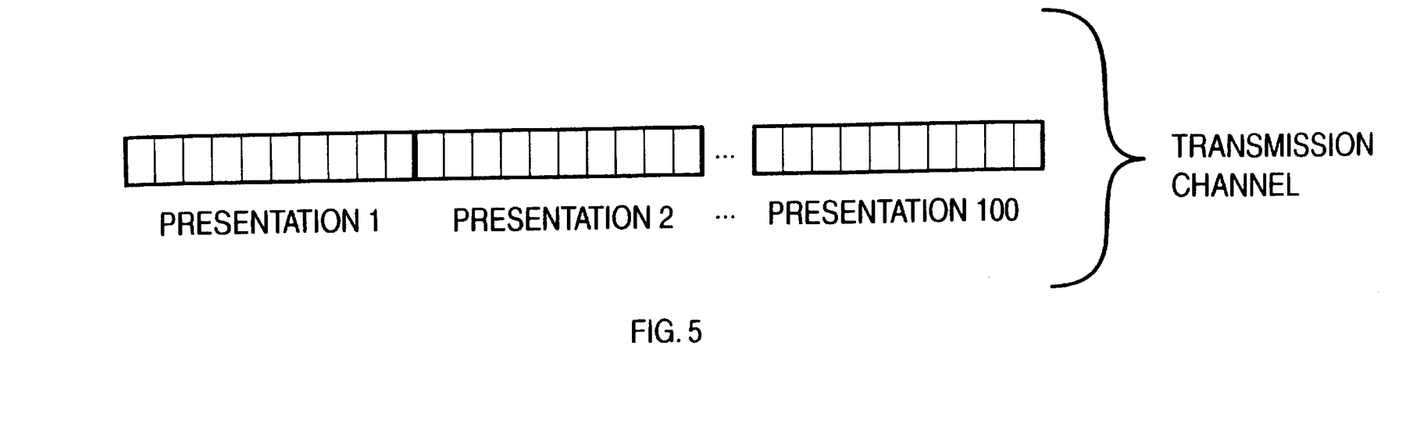

As indicated in FIG. 5, another approach may be to transmit all 100 presentations 1 through 100 within a single transmission channel to 100 different user sites. However, such an approach would require 100 different presentations times 10 minute intervals each for a total of 1,000 minutes of transmission time. Thus, such an approach may well be unduly burdensome for the transmission network.

Thus, it would be highly desirable to enable a large number of different customized presentations to be created and transmitted over networks to remotely located user sites, where the user can retrieve his or her own individualized presentation on demand, without unduly burdensome network bandwidth requirements or presentation server requirements. Also, such an arrangement should provide for conveniently and efficiently updating or otherwise modifying periodically the customized presentations and distributing them efficiently and effectively to a large variety of user sites at remote locations.

SUMMARY OF THE INVENTION

Therefore, the principal object of the present invention is to provide a new and improved method and system for customizing and distributing presentations for user sites.

A further object of the present invention is to provide such a new and improved method and system wherein the customized presentations are transmitted over networks for utilization on demand without unduly oppressive bandwidth and presentation server requirements.

Another object of the prevent invention is to provide such a new and improved method and system wherein the customized presentations can be updated periodically in an efficient and effective manner.

Briefly, a method and apparatus for customizing and distributing presentations enables a large number of remotely located user sites to receive the presentations on demand without unduly burdensome network bandwidth and presentation server requirements. The presentations can be updated or otherwise modified periodically in a flexible and efficient manner.

A method and system for customizing and distributing for user sites is disclosed and includes gathering user profile information to create data objects based on individual user profile information. The data objects are accessible locally in a group of user computer sites. Presentation logic objects used in conjunction with data objects facilitate the creation of individual customized presentations, at the user sites. The data objects are accessible locally at the user computer site. Presentation media objects are broadcasted to the computer sites. Certain ones of the media components of the media objects are selected in response to the individual presentation logic objects and the individual data objects to create customized presentations for the users at their user sites.

BRIEF DESCRIPTION OF DRAWINGS

The above mentioned and other objects and features of this invention and the manner of attaining them will become apparent, and the invention itself will be best understood by reference to the following description of the embodiments of the invention in conjunction with the accompanying drawings, wherein.

BEST MODE FOR CARRYING OUT THE INVENTION

Figure 1:
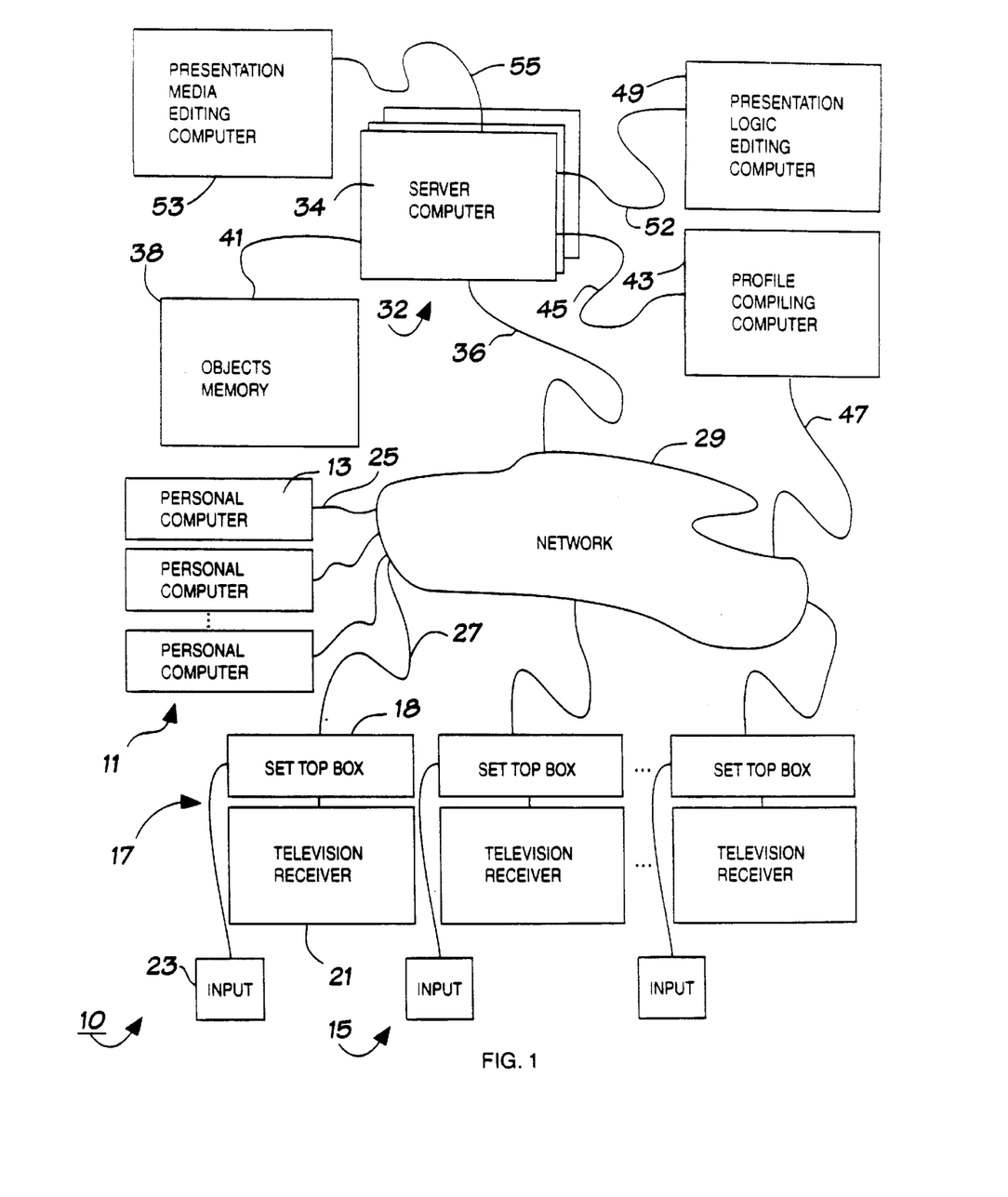
FIG. 1 is a system block diagram of the presentation customizing and distributing system of the present invention.

Referring now to the drawings, and more particularly to FIG. 1 thereof, there is shown a presentation customizing and distributing system 10, which is constructed in accordance with the present invention. The system 10 generally comprises a group of personal computer sites generally indicated at 11, such as a user computer site 12 in the form of a personal computer 13. The system 10 also includes a group of set top box user sites generally indicated at 15, such as a user site 17 in the form of a set top box 18 connected in communication with a television receiver 21, and having an input device 23, such as a keyboard, mouse or other such device. The computer equipment in the form of personal computers, set top boxes, and other similar types of devices located at the user sites are conventional, and are adapted to receive down loaded messages or presentations.

Cables, such as cables 25 and 27 interconnect the computer devices, such as the respective personal computer 13 and the set top box 18, to a transmission network 29, such as a cable television network, an Internet or other computer network, a broadcast television network, or a satellite system. A group of server computers generally indicated at 32 include a server computer 34 connected via a cable 36 to the network 29 and via a cable 41 to an objects memory 38. The objects memory 38 stores presentation media objects which include a set of media components. Also stored in the object memory 38 are profile data objects which are based on user profile information for the users associated with the user sites. Additionally, presentation logic objects are also stored and are used in conjunction with data objects and media objects to facilitate creating customized presentations.

A profile compiling computer 43 is connected via a cable 45 to the server computer 34 to facilitate the compiling of the profile data objects. A cable 47 also connects the profile compiling computer 43 to the network 29 so that the computer 43 can also function interactively directly with the computer devices, such as the personal computer 13 or set top box 18 for compiling the profile data objects. A presentation logic editing computer 49 is connected by a cable 52 to the server computer 34 and facilitates the editing of the presentation logic objects.

A presentation media editing computer 53 is connected to the server computer 34 with a cable 55 to create and edit media objects, which can be stored in the objects memory 38 via the server computer 34 or via a local area network (not shown).

The inventive system 10 shown in FIG. 1 facilitates the distribution of different customized presentations to many viewers using a common network or broadcast infrastructure such as the Internet or other computer network, a cable television system or network, a broadcast television network, or a satellite system. In the event of a one way system such as satellite, an alternate method such as telephone modem may be used for return data. The system 10 enables massive transmissions of large numbers of uniquely different customized presentations to each one of the user sites without unduly burdening the network bandwidth requirements or server computer capacity.

In operation, for example, in accordance with the inventive method, user profile information is gathered by utilizing the profile compiling computer 43. The profile data object is then created based on the individual user profile information. The data objects are then conveyed to the computer 34, which in turn stores the data objects in the objects memory 38. The data objects can be transmitted from the server computer 34 via the network 29 to the individual selected user site, such as the user site 17.

Presentation logic objects are created to facilitate the creation of individual customized presentations. The presentation logic objects are created in the presentation logic editing computer 49. The presentation logic objects may also be created by the server computer 34. The presentation logic objects may be stored centrally in the object memory 38, and then when desired, can be made available to the individual user for accessing locally.

The server computer 34 can also create presentation media objects either with the help of the presentation media editing computer 53 or independently thereof. Media objects may be stored in the objects memory 38 or made available to users immediately upon creation. In this regard the media objects may be downloaded and stored locally or the media objects may be streamed or transmitted to the remote user site or sites.

The server computer 34 broadcasts a presentation media object including a set of media components to a croup of remotely located user computer devices, such as the set top box 18 at the user site 17. The set top box 18 then selects certain ones of the media components in response to its presentation logic object and its data object. The set top box 18 then can combine the selected ones of the data object components to create a customized presentation for the user. The presentation can then be played back by the set top box in combination with the television receiver 21.

Figure 6:
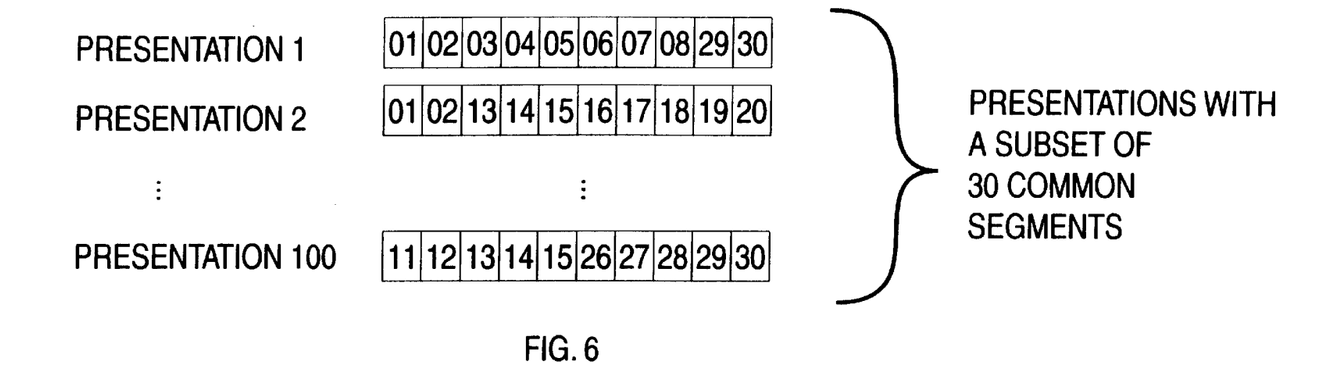
Figure 7:
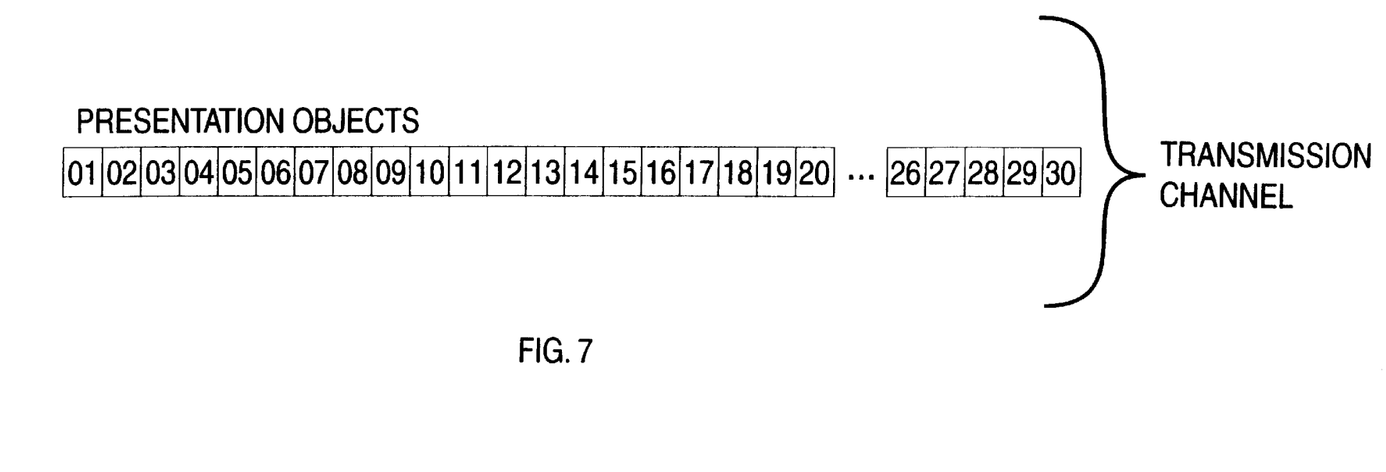

In accordance with the inventive method as indicated in FIGS. 6 and 7, assume that there are 30 basic presentation components, and that there are a total of 100 different user sites. Some of the presentation components are common presentation components shared between 100 unique presentation components (FIG. 6) for local storage at a user site such as the site 17 and then play back only the appropriate desired sequence of presentation components corresponding to the individual attributes for display to the user on demand.

As indicated in FIG. 6, the presentations may be stored on a user computer device at a user site for later viewing on demand. Some of the transmission issues can be simplified by scheduling the transmission of presentations in advance of the viewing need. This is accomplished in accordance with the present invention by sending all 100 presentations during the same 10 minute time slot for the fastest and most bandwidth and server computer intense transmission.

As shown in FIGS. 6 and 7, the inventive method represents an improvement over the prior known methods and is possible if there are presentation components or segments common to many of the presentations. If, upon analysis, it is discovered that the 100, 10 minute presentations are composed of 30 common one minute presentation segments played for each presentation in different orders or repetitions, and assuming there is a sufficiently capable client device, it is possible to transmit only the needed presentation elements and assemble the presentation as it is viewed. The server computer 34 need only transmit 30 minutes of programming as shown in FIG. 7, ten of which are selectively recorded by client computer device for sequencing and presentation at the time of viewing at a user site such as the site 17.

Thus, 30 presentation components are broadcasted in, for example, 30 minutes to all user sites, and are locally stored thereat. By selecting and arranging the components locally, the entire transmission is completed in only 30 minutes, as compared to 1000 minutes as indicated in the method illustrated in FIG. 5. As a result, according to the inventive method as indicated in FIGS. 6 and 7, 100 unique customized presentations are thus distributed via a single channel without burdening the bandwidth or server computer requirements.

The examples illustrated in the drawings arc simplified for sake of clarity by having 10 same segment length segments of combined audio and video. It should be evident to someone skilled in the art that these segments may be of various lengths and may be audio, motion picture video, text video, or a combination thereof. Further, it should be understood to those skilled in the art that although the segments identified are audio or video, they may also be any other kind of digital information such as text, graphics or programming objects such as JAVA™ programming objects.

Further, it will become apparent to those skilled in the art that in addition to sequencing of segments and other elements, a client computer device such as the personal computer 13 may be capable of mixing and combining segments and elements together in various ways as desired. For example, one of the transmitted elements may be a music track for the presentation to be created that has not been combined with any other element. This music track may be mixed or otherwise combined with other audio information as the presentation is viewed by the client computer device. Further, a sufficiently capable client computer device may create graphic elements and composite them with video elements as needed. Any combination of media and/or data which can be accomplished by the client computer device live in real time, or which can be created in advance of presentation, may be utilized.

These examples assume real time transmission of programming such as is conventionally achieved in cable television systems currently. It should be understood that the present inventive method can be applied to non-real time applications as well. Such applications can be transmitted either faster or slower than real time. Also, some elements for the same presentation may transmit at faster than real time, while others are sent in real time or slower than real time.

Considering now the method of the present invention, profile data is collected for each recipient. This data may come from data bases, survey instruments, multi-rater instruments, expert input or inferred data based on behavior monitoring. The data may be collected via the profile compiling computer 43 or in an interactive manner directly between the computer 43 and the useI device such as the personal computer 13 via the network 29.

Figure 8:
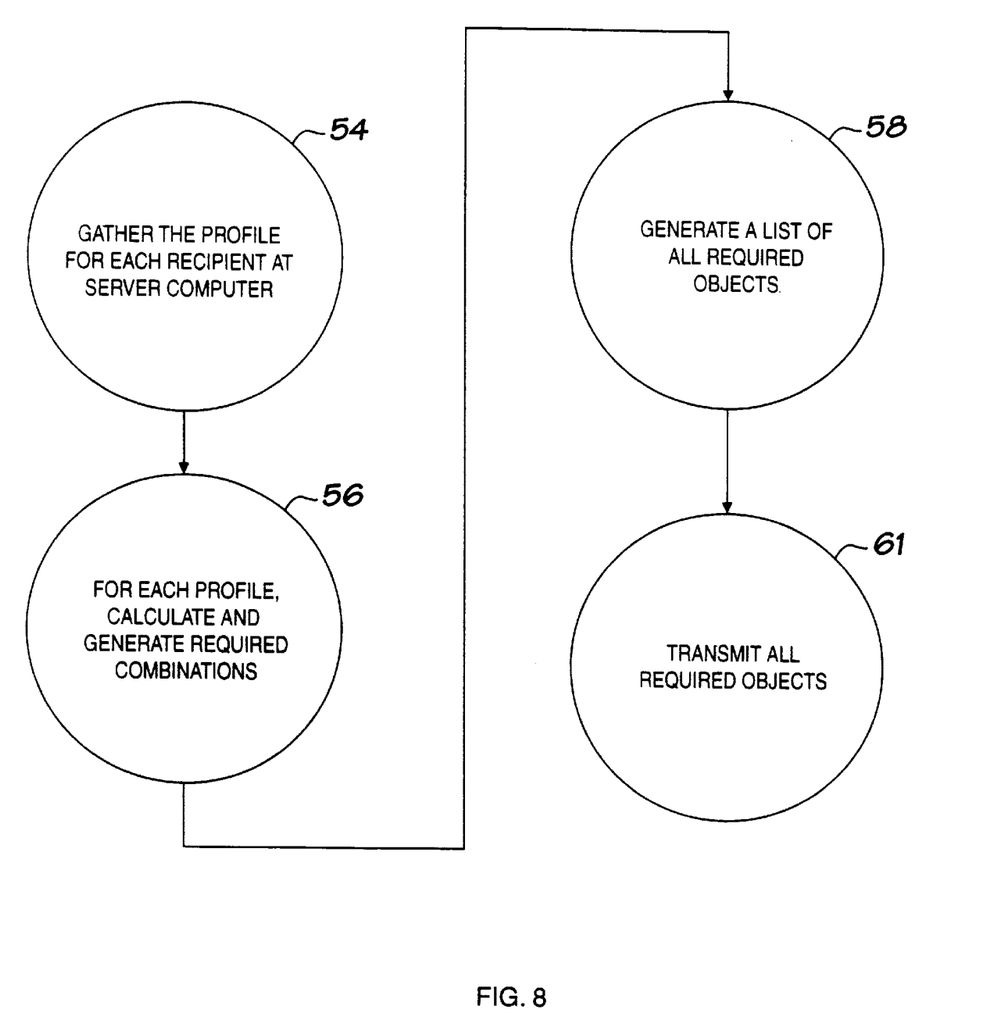
FIGS. 8 and 9 are flow chart diagrams explaining the operation of the system of FIG. 1.
Figure 9:
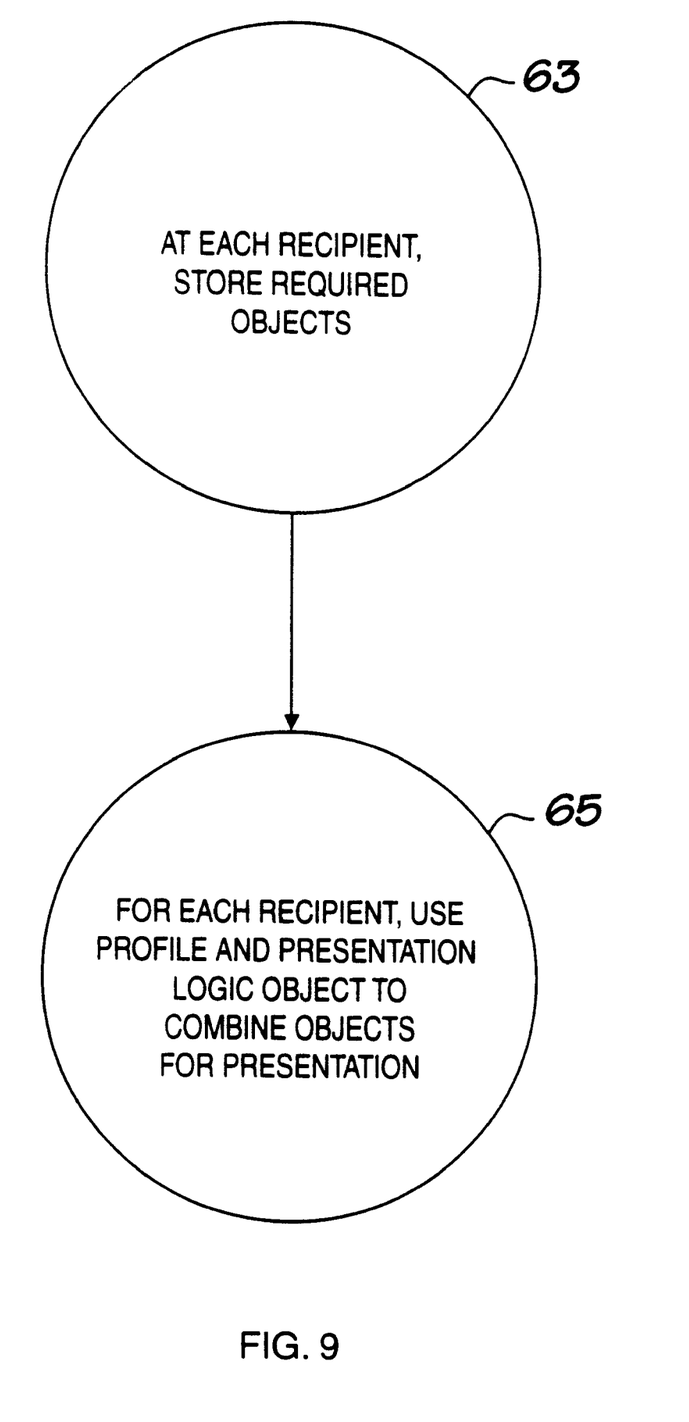

In accordance with one mode of operation of the system 10, as shown in FIGS. 8 and 9, the central media repository server computer 34 broadcasts or multicasts all the presentation objects and each receiving computer device such as the personal computer 13 selects all or portions of the objects to save locally. As shown in box 54 of FIG. 8, in a more efficient method, the system 10 collects the data for all recipients (or a day abstract). The collected data are used to calculate and determine the required media objects for all presentations as shown in box 56. At box 58, from that processing, a list is generated which identifies all objects required to create all presentations. As indicated at box 61, this list of objects is then broadcast or multi-cast to recipients, such as the set top box 18.

Referring now to FIG. 9, storage for each recipient is loaded with the appropriate objects from the broadcast or multi-cast as shown at box 63. The selection of what is stored may be based on profile data existing in the recipient device or the stored presentation logic object in conjunction with its stored profile data object. The presentation logic object may be part of the broadcast or multicast.

As indicated at box 65, once the presentation logic objects and presentation media objects are present or available through streams to the recipient computer device, the presentation may be made to the user recipient.

All presentations described above are composed of these kinds of objects: presentation logic objects, presentation media objects, and profile data objects. Each of these kinds of objects is created and edited by applications appropriate for the purpose. For example, the presentation logic objects may be created in the presentation logic editing computer 49 which establishes the relationship between the various forms of media objects and the data objects.

The distinction between the three kinds of objects is made for sake of clarity. It will become apparent to those skilled in the art that these objects may have overlapping elements or redundant functions in a given implementation.

Further, it should be understood that any of the kinds of objects described may from time to time change from static objects to dynamic objects and back again. Objects may be updated in their entirety or incrementally.

Additionally, it will become apparent to those skilled in the art that these various objects may flow in any direction between the server computers and client or user computer devices. For example, profile data objects may be created, added to or modified from time to time by the producer or the viewer or a third party (depending on the application) for use by them and/or transmitted to one of the other three. Similarly, depending on the application, the producer, viewer or a third party may modify presentation media objects or presentation logic objects.

Presentation logic objects and/or various objects that are a part of a presentation may have communication with other servers or peers on the network 29. For example, a media object may obtain data updates on a periodic, demand or interrupt basis from a data source such, for example, such as a stock market.

The transmission of objects may be over the network 29, or other media.

Physical Therapy Example

The process for a physical therapy application begins with a video prescription filled in by a (physician or) physical therapist. The video prescription is filled out as a form on a World Wide Web page via the network 29 (FIG. 1) by the therapist. The therapist provides the patient's name, billing information, electronic address information, therapeutic objective, relevant history, relevant demographics and exercise regimen. The resulting data object is transmitted to the fulfilling server.

The fulfilling server does appropriate billing and creation of the presentation logic object for the patient. The presentation logic object is transmitted via email to the patient's set top box such as the box 18 (FIG. 1). A portion of the email confirms the order and informs the patient as to when the exercises will be ready for viewing.

At the fulfillment server computer 34, the media objects required for the patient's presentation are included in the list of materials to be transmitted. At a predetermined time, the objects are transmitted from the server computer 34 via the network 29 to the user sites, using a multicast which includes the objects for all patients receiving physical therapy.

The set top box of the patient stores the relevant objects from the multicast based on instructions from the presentation logic portion of the email.

When the materials are available, the patient runs the presentation and follows the directions, observing the appropriately described cautions to perform the needed exercises. At the end of each exercise, the patient responds to a data collecting object that asks the patient how the patient feels. These data are reported back to the physical therapist via the network 29 and may be used to automatically modify the program or allow the physical therapist to update the program based on his or her review of the data. The therapist may elect to modify the exercise regimen and transmit a new data object.

This cycle of data collection, exercise and program modification continues until the therapeutic objective has been reached. There are, of course, a variety of many different approaches to accomplish the desired result.

The presentation logic object could be created at the physical therapy's office computer (such as the personal computer 13) or in a client/server method.

Any of the objects in the system could be encrypted to protect against copying or unauthorized duplication where privacy or intellectual property protection is important.

There could be a version of the program using graphics or low quality video for guidance until the full media treatment is available.

Automotive Marketing Example

An automotive example begins with the consumer indicating product interest in response to an advertisement shown from his or her television receiver. After indicating interest, the customer is asked to respond to a questionnaire on screen indicating other cars of interests, purchase horizon, and things that are important to the customer. The customer is also asked permission to release relevant demographic data from their local profile. If some or all of such data is missing then default data objects may be substituted. For example, if the consumer did not indicate an alternative car of interest, that related portion of the presentation would be deleted or a generic presentation element would be substituted.

The data object is sent to the fulfilling server computer, such as the computer 34, for follow up by the automotive company and a presentation logic object is created locally.

The presentation logic object selects from multiple broadcast streams as the viewer is watching and a real time presentation is shown to the customer ending with another response object asking if the customer would like a test drive at their local dealer.

The object transmitted with the commercial may cause the initiation of a message back to the fulfilling server. For example, the message may advise the customer's local car dealer to contact the customer to arrange a test drive. Alternatively, the message could advise the customer's local car dealer if the customer showed interest in the product.

Rather than using simultaneous streams, the set top box such as the box 18 may also buffer segments as needed.

There are a number of current and emerging technologies which are employed to realize the invention described herein. For example, Apple Computer, Inc.'s QUICK-TIME™ architecture is employed for creating and maintaining media objects. As another example, Sun Microsystems, Inc.'s JAVA™ technology is employed to provide presentation logic and data objects. In this regard, Apple Computer, Inc.'s QUICKTIME FOR JAVA™ technology used in conjunction with JAVA™ technology is employed to provide a complete development environment.

Another technology which may be used to encapsulate the functionality of the invention is the developing ISO standard, MPEG4. This could be employed to provide the media objects for manipulation by the presentation logic object. Further, MPEG4 could provide synthesized content in the form of human representations, driven through the presentation logic object by the data object.

Another technology that may be adapted to this invention is MACROMEDIA FLASH™ technology. This technology may be used to provide media objects for manipulation by a presentation logic object.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A method for customizing and distributing presentations for user sites, comprising:

gathering user profile information;

creating profile data objects based on individual user profile information;

accessing the profile data objects individually locally in each one of a group of user computer means;

creating presentation logic objects based on corresponding ones of the data objects to facilitate the creation of individual customized presentations for each one of the user computer means;

storing each one of the presentation logic objects individually locally in the group of user computer means;

broadcasting a single universal presentation media object including a set of media components to each one of a group of remotely located user computer means;

receiving the universal presentation media object individually at each one of the group of user computer means;

selecting certain ones of the media components at each one of the user computer means in response to its presentation logic object and its data object; and arranging the selected ones of said media components to create customized presentations for the users.

2. A method according to claim 1, further including adding profile data objects periodically.

3. A method according to claim 1, further including modifying said profile data objects periodically.

4. A method according to claim 1, further including adding media objects periodically.

5. A method according to claim 1, further including modifying said media objects periodically.

6. A method according to claim 1, further including using default data objects in the absence of an individual user profile information.

7. A method according to claim 1, further including sending messages from local user computer means in response to the activation of the customized presentation by the user.

8. A method according to claim 1, wherein at least some of said objects are encrypted.

9. A method according to claim 1, wherein at least some of said objects employ QUICKTIME™.

10. A method according to claim 1, wherein at least some of said objects employ JAVA™.

11. A method according to claim 1, wherein at least some of said objects are expressed in MPEG4.

12. A method according to claim 1, wherein at least some of said objects are created with MACROMEDIA FLASH™ technology.

13. A system for customizing and distributing presentations for user sites, comprising:

means for gathering user profile information;

means for creating profile data objects based on individual user profile information;

means for accessing the profile data objects individually locally in each one of a group of user computer means;

means for creating presentation logic objects based on corresponding ones of the data objects to facilitate the creation of individual customized presentations for each one of the user computer means;

means for storing each one of the presentation logic objects individually locally in the group of user computer means;

means for broadcasting a single universal presentation media object including a set of media components to each one of a group of remotely located user computer means;

means for receiving the universal presentation media object individually at each one of the group of user computer means;

means for selecting certain ones of the media components at each one of the user computer means in response to its presentation logic object and its data object; and means for arranging the selected ones of said media components to create customized presentations for each individual on of the users.

14. A system according to claim 13, further including means for adding profile data objects periodically.

15. A system according to claim 13, further including means for modifying said profile data objects periodically.

16. A system according to claim 13, further including means for adding media objects periodically.

17. A system according to claim 13, further including means for modifying said media objects periodically.

18. A system according to claim 13, further including means for using default data objects in the absence of an individual user profile information.

19. A system according to claim 13, further including means for sending messages from local user computer means in response to the activation of the customized presentation by the user.

20. A system according to claim 13, wherein at least some of said objects employ encryption means.

21. A system according to claim 13, wherein at least some of said objects employ QUICKTIME™ means.

22. A system according to claim 13, wherein at least some of said objects employ JAVA™ means.

23. A system according to claim 13, wherein at least some of said objects employ MPEG4 means.

24. A system according to claim 13, wherein at least some of said objects employ MACROMEDIA FLASH™ means.

* * * * *